United States Patent Office 3,714,005
Patented Jan. 30, 1973

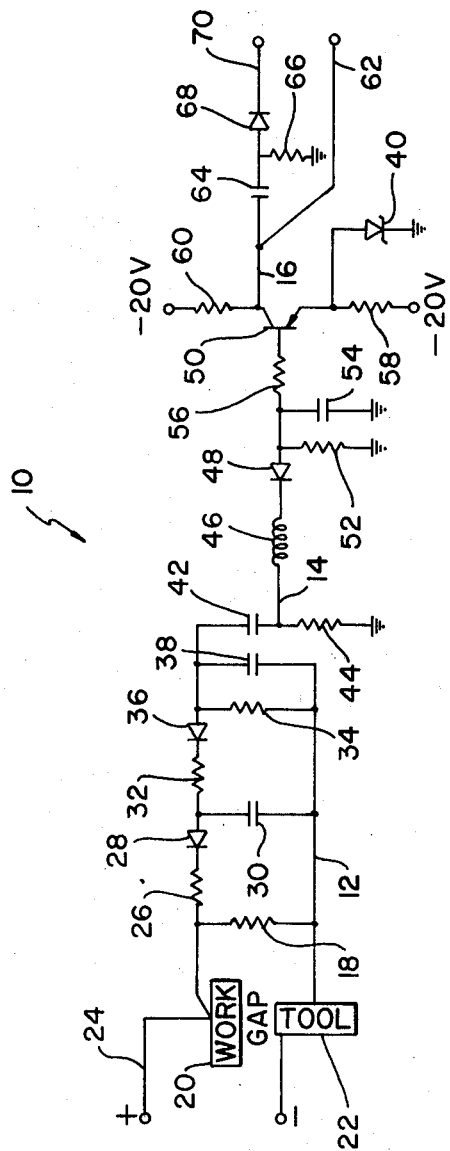
INVENTOR.
ROBERT W. DRUSHEL
ATTORNEYS

3,714,005
PERCENTAGE OF MAXIMUM CURRENT AND THRESHOLD VOLTAGE RESPONSIVE ELECTRONIC CONTROL CIRCUIT AND METHOD
Robert W. Drushel, 31905 Nottingwood,
Farmington, Mich.
Application Nov. 18, 1966, Ser. No. 595,442, now Patent No. 3,564,528, which is a continuation-in-part of applications Ser. No. 573,999, Aug. 22, 1966, now Patent No. 3,508,115, Ser. No. 583,875, Oct. 3, 1966, now Patent No. 3,591,851, Ser. No. 585,395, Oct. 10, 1966, now Patent No. 3,521,083, and Ser. No. 595,189, Nov. 17, 1966, now Patent No. 3,471,750. Divided and this application Feb. 16, 1971, Ser. No. 115,668
Int. Cl. B01k *3/00;* B23p *1/02*
U.S. Cl. 204—129.2                                  10 Claims

ABSTRACT OF THE DISCLOSURE

Structure for and method of providing an output signal in response to a sensed current reaching a percent of maximum current prior to a sensed voltage reaching a threshold voltage and after the voltage sensed returns below the threshold voltage for a predetermined time. The structure includes an electronic circuit for sensing a percentage of maximum current in an electroerosion machining circuit and providing an output signal in response thereto, a circuit for sensing the voltage across the gap in the electroerosion machining circuit and providing an output any time the voltage sensed is above a threshold voltage level or returns below the threshold voltage level for a predetermined time, an output circuit for providing an output in response to an input signal thereto, a gate circuit connected between the current sensing circuit and the output circuit for permitting passage of an output signal from the current sensing circuit to the input of the output circuit only when the gate circuit is open and a gate control circuit for closing the gate circuit in response to an output signal from the voltage sensing circuit.

CROSS REFERENCE TO RELATED APPLICATIONS

This application is a division of patent application Ser. No. 595,442, filed Nov. 18, 1966, now U.S. Pat. No. 3,564,528, which is a continuation-in-part of patent applications Ser. No. 573,999, filed Aug. 22, 1966, now Pat. No. 3,508,115; Ser. No. 583,875, filed Oct. 3, 1966, now U.S. Pat. No. 3,591,851; Ser. No. 585,395, filed Oct. 10, 1966, now Pat. No. 3,521,083, and Ser. No. 595,189, filed Nov. 17, 1966, now Pat. No. 3,471,750.

BACKGROUND OF THE INVENTION

Field of the invention

The invention relates to electroerosion machining control circuits and refers more specifically to a circuit for and method of providing an output signal in response to the current in an electroerosion machining circuit reaching a selected percent of a maximum current signal in the machining circuit only if the voltage across the gap of the machining circuit has not attained a threshold value prior to the current reaching the predetermined percent of maximum current or if the voltage across the gap has returned through the threshold voltage for a predetermined time after having initially reached the threshold value prior to the current reaching the selected percent of maximum current.

Description of the prior art

In electroerosion machining circuits of the past, separate circuits have often been provided for monitoring either the voltage or the current in the electroerosion machining circuit and for providing output control signals in response to predetermined levels or variations of the current and voltage signals sensed. Seldom have both current and voltage been monitored to provide output control circuits. Wherein both current and voltage signals have been monitored in the past to provide output control signals, they have not been related to provide a single output control signal in response to the current and voltage signals reaching indicated levels or variations in a predetermined time with respect to each other.

Thus, there are no known prior circuits wherein an output control signal is provided only in response to sensed current in an electroerosion machining circuit arriving at a selected percentage of a maximum current signal prior to arrival of a voltage sensed across the gap of the electroerosion machining circuit arriving at a threshold voltage level. Such signal is particularly advantageous in electrochemical machining where it is harmful to the workpiece if a high current is present flowing in the electrochemical machining circuit without the associated voltage in the circuit having attained at least a predetermined minimum threshold level.

SUMMARY OF THE INVENTION

In accordance with the present invention there is provided electronic control structure for use with electroerosion machining circuits or the like and in particular in an electrochemical machining circuit including a first electronic circuit for sensing the current flowing in the electrochemical machining circuit and for providing an output signal in response to a current signal equal to a selected percentage of the maximum current signal in the electrochemical machining circuit, a voltage sensing circuit connected across the gap of the electrochemical machining circuit for providing an output signal in response to the voltage across the gap being at or above a predetermined threshold voltage level, an output circuit connected to receive the output of the current sensing circuit on opening of a gate circuit connected between the current sensing circuit and the output circuit, and a gate control circuit connected between the voltage sensing circuit and the gate circuit for closing the gate circuit in response to an output signal from the voltage sensing circuit. The voltage sensing circuit further includes means for preventing loss of output from the voltage sensing circuit for a predetermined time after the voltage sensed by the voltage sensing circuit returns through the threshold voltage level after having once passed through the threshold voltage level circuit so that transient voltage variations will not provide an output signal from the electronic control structure.

BRIEF DESCRIPTION OF THE DRAWINGS

The drawing is a schematic diagram of a percent of maximum current signal and threshold voltage responsive control circuit constructed in accordance with the invention.

DESCRIPTION OF THE PREFERRED EMBODIMENTS

The percent of maximum current and voltage threshold comparing circuit 10 shown in the figure includes the voltage threshold circuit 12 having the gap signal input portion 14, the isolation portion 16 and the voltage trip point selection and amplification portion 18. Circuit 10 further includes the adjustable percent of maximum current circuit 20, gate control circuit 22, gate circuit 24 and control signal amplifier circuit 26.

The percent of maximum current and voltage threshold comparing circuit 10 is connected to monitor the electrochemical machining circuit 32, as shown. The electrochemical machining circuit as shown includes the workpiece 28, a tool 30 defining a machining gap 34 therebetween with the tool connected to the negative terminal and the work connected to the positive terminal of a source of direct current electrical energy. A direct current shunt 36 is positioned in the electrochemical machining circuit between the work and positive terminal of the voltage source to provide an output signal to the direct current amplifier 38 proportional to the current flowing in the circuit 32 as set forth in more detail in U.S. Pat. 3,564,528 referred to above.

The gap signal input portion 41 of circuit 12 is connected directly across the work 28 and tool 30 of the electrochemical machining circuit 32 and includes the resistor 40 connected across the gap 34, the Zener diode 42 and capacitor 44 connected in parallel across the resistor 40 for limiting the voltage applied to the isolating portion 16 of circuit 12 and the parallel resistor 46 and the capacitor 48 connected between the resistor 40 and the parallel capacitor 44 and Zener diode 42, as shown.

The signal input portion 14 of circuit 12 limits the current supplied to the isolation portion 16 of circuit 12 to that permitted by the Zener diode 42, removes the hash or extraneous signals found across the gap 34 between the work 28 and tool 30 and through capacitor 48 provides a fast transfer of the voltage across the gap to the isolation portion 16 of the circuit 12.

The isolation portion 16 of the circuit 12 includes the transistor 50 connected in emitter-follower configuration with the collector connected directly to the indicated minus twenty volt electrical energy source and the emitter connected to electronic common through the resistor 52. The protecting diode 54 is connected between the emitter and base of the transistor 50. Thus, the rest of the circuit following the isolation portion 16 is isolated from the gap voltages and the voltage appearing across the isolated portion 16 of circuit 12 is imposed on electronic common so as to be useful with other similarly imposed signals in the electronic control circuit 10.

The portion 18 of circuit 12 includes the current limiting resistor 56, the Zener diode 58, resistor 60, resistor 62, a transistor 64, resistor 66 and capacitor 68 connected as shown in the figure.

The Zener diode 58 is provided to prevent the voltage signal between the work 28 and tool 30 from driving the normally off transistor 64 on until it has attained a threshold voltage level of, for example, two volts. Thus, the control circuit 10 operates around a threshold voltage of approximately two volts established by the Zener diode 58.

The transistor 64 which is normally off conducts on receiving the threshold voltage through Zener diode 58 to provide a positive going output signal which varies between approximately minus sixteen and zero volts on the collector of the transistor 64 on turning on of the transistor. Capacitor 68 provides a time constant along with the resistors 60 and 66 so that turn-off of the transistor 64 is not as rapid as turn-on thereof.

Thus, in operation the transistor 64 turns on sharply when the voltage across the gap 34 is above the threshold level set by the Zener diode 58 and remains in this state until the voltage again crosses the threshold level in the opposite direction at which time the output signal from the transistor 64 will begin to fall toward the minus sixteen volts at a rate determined by the value of the time constant including capacitor 68. Consequently, short sparks and similar signals will not cause an output signal from the circuit 10 due to loss of the threshold voltage output from circuit 12.

The gate control circuit 22 as shown includes the normally off transistor 70 having the emitter connected directly to electronic common and the collector connected to the twenty-four volt source of electrical energy through the resistor 72. The base of the transistor 70 is connected to the collector through the capacitor 74. The base of the transistor 70 is further connected to the collector of the transistor of the threshold voltage circuit 12 through the current limiting resistor 76 and across the protecting diode 78. A source of twenty-four volt electrical energy is also connected to the base of the transistor 70 through the resistor 80, as shown.

In operation, the transistor 70 of the gate control circuit 22 is normally nonconducting whereby a large positive voltage is present on the collector. When the voltage in the circuit 12 exceeds the threshold voltage set by the Zener diode 58, the signal from the collector of the transistor 64 provides a bias on the transistor 70 to turn the transistor on, whereby the collector of the transistor 82 of the percent of maximum current circuit 20 is placed substantially at ground through the resistor 84 and diode 86. The capacitor 74 provides the desired turn-on and turn-off time for the transistor 70 in conjunction with the resistors 72, 76 and 80.

The gate control circuit 22 is ineffective to prevent passage of a signal between the percent of maximum current circuit 20 and the control signal amplifier 26 through the gate circuit 24 when no signal is provided the gate control circuit 22 from the voltage threshold circuit 12. However, when a signal is present from the voltage threshold circuit 12, the grounding of the collector of the transistor 82 through the resistor 84, diode 86 and conducting transistor 70 is effective to prevent a signal passing to the control signal amplifier circuit 26 through gate 24.

The gate circuit 24 includes the resistor 84, resistor 88 and the diode 86. As indicated above, the function of the gate circuit 24 is to prevent a signal from passing to the control signal amplifier 26 from the percent of maximum current circuit 20 when the voltage across the gap is not at least equal to the threshold voltage established by the Zener diode 58.

The percent of maximum current circuit 20, as shown, includes the transistor 82 having the collector returned to electronic common through a resistor 90 and an emitter connected to a positive twenty-four volt source of electrical energy through a resistor 92. The operating voltage of the transistor 82 is determined by the Zener diode 94 connected to the emitter thereof, whereby for example, approximately eighteen volts may be present at the emitter. The emitter is tied to the base of the transistor 82 through a diode 96 to prevent inverse voltage peaks from harming the transistor 82 while the collector is connected to the base through the capacitor 98. The base of the transistor 82 is further connected through the current limiting resistor 100 to the wiper arm 102 of the variable resistor 104 in the voltage divider network, including the resistances 106, 104 and 108 which receive the output from the direct current amplifier 38.

Thus, the signal appearing on the base of the transistor 82 of the percent of maximum current circuit 20 will be a selected portion of the maximum current through the shunt 36 in the machining circuit 32. When the electrochemical machining circuit is energized, the current through the shunt 36 and the voltage across the gap 34 will start to build up. At the selected current percentage, depending on the position of the wiper arm 224, as for example, ten percent, the transistor 82 which is normally off, will turn on the provide an output signal through the gate 24 to the control signal amplifier circuit 26.

The control signal amplifier circuit 26 includes the normally off transistor 110 having an emitter connected to the source of positive twenty-four volt electrical energy through the resistor 112 and to electronic common through the Zener diode 114 which establishes for example a 2.4 volt positive electrical signal on the emitter and a collector connected to the positive twenty-four volt source of electrical energy through the resistor 116.

The output signal from the control signal amplifier 26 is over the conductor 118 through resistor 120 and across the resistor 122 which in turn is connected to the negative twelve volt source of electrical energy. The control signal amplifier circuit 26 thus serves to provide an output signal on receipt of a positive going pulse from the percent maximum current select circuit 20.

However, as previously indicated, after the voltage in the electrochemical machining circuit 32 across the gap 34 between the work 28 and tool 30 reaches a predetermined threshold level as set by the Zener diode 58, the transistor 70 in the gate control circuit 22 is turned on in response to an output signal from the voltage sensing circuit 12 to return the output signal from the percent maximum selected current circuit 20 to electric common through the gate circuit 24, thus preventing an input signal to the control signal amplifier circuit 26 whereby no output is provided from the control signal amplifier circuit 26.

A control signal output is therefore provided on conductor 118 in response to the current in the electrochemical machining circuit 32 reaching the predetermined percent of maximum current selected by the setting of the wiper arm 102, which is sufficient to turn the transistor 82 on, prior to the voltage across the gap 34 in the electroerosion machining circuit 32 attaining the threshold level set by the Zener diode 58 and required to provide an output from the voltage sensing circuit 12 to the gate control circuit 22.

As previously indicated, with the current above the selected percent of maximum current whereby transistor 82 is turned on, an output signal will also be provided by the control signal amplifier circuit 26 if the voltage in the gap 34 of the electrochemical machining circuit 32 returns below the threshold level established by the Zener diode 58 for a time longer than the time constant of resistors 60 and 66 in conjunction with capacitor 68 to cause the transistor 70 of the gate control circuit 78 to return to its nonconducting condition in response to turning off of transistor 64 and thus open the gate circuit 24.

While one embodiment of the present invention has been considered in detail, it will be understood that other embodiments and modifications thereof are contemplated. It is the intention to include all embodiments and modifications as are defined by the appended claims within the scope of the invention.

What I claim as my invention is:

1. Structure for monitoring an electroerosion machining circuit comprising means for sensing the current flowing in the machining circuit, means connected across a portion of the machining circuit for sensing the voltage across the portion of the machining circuit and means connected to the current sensing and voltage sensing means for providing an output signal in response to sensing of a predetermined percentage of a maximum current signal in the machining circuit only if the predetermined percentage of a maximum current signal is sensed prior to sensing of a predetermined threshold voltage across the portion of the machining circuit.

2. Structure as set forth in claim 1 wherein the means for providing an output signal further includes means for providing the output signal in response to the voltage sensed across the portion of the machining circuit falling below the predetermined threshold voltage level subsequent to the voltage rising above the threshold voltage level prior to the current attaining the predetermined percentage of maximum current with the current sensed remaining at or above the predetermined percent of maximum current in the machining circuit.

3. Structure as set forth in claim 2 and further including means connected in the voltage sensing means for delaying the providing of the output signal in response to the voltage falling below the predetermined threshold voltage level for a predetermined time after the voltage has fallen below the threshold voltage level.

4. Structure as set forth in claim 1 wherein the machining circuit is an electrochemical machining circuit and the voltage sensing means comprises an electronic circuit including a gap signal input portion connected in parallel with the workpiece and tool of the machining circuit for sensing the voltage across the gap and providing an output signal of stable voltage and limited current in response to the voltage signal across the gap, an isolation portion connected to the gap signal input portion for receiving the output signal from the gap signal input portion and for providing an output signal representative of the voltage across the gap and isolated from the gap, and a voltage trip point and amplification portion for establishing the threshold voltage level and providing an output signal in response to the voltage signal from the isolation portion reaching a predetermined magnitude.

5. Structure as set forth in claim 1 wherein the machining circuit is an electrochemical machining circuit and the current sensing means comprises a shunt in the machining circuit for providing a direct current signal proportional to the current flowing in the machining circuit, a direct current amplifier connected to the shunt for amplifying the current sensed by the shunt, a semiconductor circuit for producing an output signal in response to a predetermined input signal and voltage divider means connected between the output of the direct current amplifier and the semi-conductor circuit for providing a percentage of the output signal from the direct current amplifier as an input signal to the semi-conductor circuit whereby the semi-conductor circuit is caused to provide an output signal in response to a selected percentage of maximum current passing through the machining circuit.

6. Structure as set forth in claim 1 wherein the means for providing an output signal comprises an output amplifier circuit operable to provide an output signal in response to an input signal thereto, a gate circuit connected between the current sensing means and the output amplifier circuit for preventing an output signal from the current sensing circuit from being received by the output amplifier circuit on closing of the gate circuit and a gate control circuit connected between the gate circuit and voltage sensing means for closing the gate circuit in response to an output signal from the voltage sensing means indicating a sensed voltage above the threshold voltage.

7. An electroerosion machining circuit, circuit means for sensing a voltage in machining circuit, circuit means for sensing a percentage of the maximum current in the machining circuit and means operably associated with the voltage and current sensing circuit means for providing an output signal in response to the sensed current and voltage only when the percent of maximum current signal sensed reaches a selected magnitude before the sensed voltage reaches a threshold voltage level.

8. Structure as set forth in claim 7 wherein the means for providing an output signal comprises a gate circuit in the output of the current sensing circuit means and a gate control amplifier in the output of the voltage sensing circuit means connected to the gate circuit for returning the output from the current sensing circuit to electronic common when the sensed voltage reaches the threshold voltage before the sensed current has reached the selected percent of maximum current.

9. The method comprising the steps of sensing a voltage in an electroerosion machining circuit sensing a percentage of the maximum current in the machining circuit and providing an output in response to the sensed current and voltage when the percent of maximum current signal sensed reaches a selected magnitude before the sensed voltage reaches a threshold voltage.

10. The method as set forth in claim 9 and further including the step of providing an output signal in response to the sensed voltage returning below the threshold voltage for a predetermined time after first passing through the threshold voltage prior to the percent of maximum current signal reachining the selected magnitude.

References Cited

UNITED STATES PATENTS

| | | | |
|---|---|---|---|
| Re. 27,312 | 3/1972 | Petroff | 204—228 X |
| 3,607,689 | 9/1971 | Inoue | 204—228 X |
| 3,650,923 | 3/1972 | Berghausen et al. | 204—228 X |
| 3,652,440 | 3/1972 | Dehner | 204—228 |
| 3,664,945 | 5/1972 | Junker et al. | 204—143 M X |

JOHN H. MACK, Primary Examiner

D. R. VALENTINE, Assistant Examiner

U.S. Cl. X.R.

204—228; 219—68